(12) United States Patent
Kim

(10) Patent No.: US 8,007,124 B2
(45) Date of Patent: Aug. 30, 2011

(54) SELF-GENERATING STREETLIGHT

(75) Inventor: Song-tae Kim, Suwon-si (KR)

(73) Assignee: Yangg Solar (KR)

( * ) Notice: Subject to any disclaimer, the term of this patent is extended or adjusted under 35 U.S.C. 154(b) by 282 days.

(21) Appl. No.: 12/304,911

(22) PCT Filed: Jun. 14, 2007

(86) PCT No.: PCT/KR2007/002863
§ 371 (c)(1),
(2), (4) Date: Dec. 15, 2008

(87) PCT Pub. No.: WO2007/145469
PCT Pub. Date: Dec. 21, 2007

(65) Prior Publication Data
US 2009/0231838 A1  Sep. 17, 2009

(30) Foreign Application Priority Data

Jun. 15, 2006  (KR) .................. 10-2006-0053987

(51) Int. Cl.
*F21L 4/00* (2006.01)
(52) U.S. Cl. ........ 362/158; 362/183; 362/267; 362/276; 362/431
(58) Field of Classification Search .................. 362/158, 362/183, 431, 267, 276
See application file for complete search history.

(56) References Cited

U.S. PATENT DOCUMENTS

| 4,200,904 | A | * | 4/1980 | Doan | 362/183 |
| 4,281,369 | A | * | 7/1981 | Batte | 362/183 |
| 6,131,321 | A | * | 10/2000 | Daigle, Jr. | 40/612 |
| 7,360,919 | B2 | * | 4/2008 | Chan | 362/183 |
| 7,731,383 | B2 | * | 6/2010 | Myer | 362/145 |

FOREIGN PATENT DOCUMENTS

| JP | 06-141478 | 5/1994 |
| JP | 08-138422 | 5/1996 |
| JP | 2000-188007 | 7/2000 |

OTHER PUBLICATIONS

International Search Report-PCT/KR2007/002863 dated Sep. 20, 2007.
Written Opinion-PCT/KR2007/002863 dated Sep. 20, 2007.

* cited by examiner

*Primary Examiner* — Stephen F Husar
*Assistant Examiner* — James W Cranson
(74) *Attorney, Agent, or Firm* — Cantor Colburn LLP

(57) ABSTRACT

A self-generating streetlight is provided, including: a light pole; a lamp which is provided on the light pole to convert electricity into light; a condenser which comprises a central condenser plate and side condenser plates and converts solar energy into electricity, the central condenser plate being coupled to the light pole and the side condenser plate being arranged around the central condenser plate; a joint unit which allows the side condenser plates to folded to and extended from the central condenser plate; and a control box which comprises a battery, a power supply, and a controller, the battery accumulating electricity produced by the condenser, the power supply supplying the electricity to the lamp, and the controller controlling the lamp.

5 Claims, 4 Drawing Sheets

SELF-GENERATING STREETLIGHT

TECHNICAL FIELD

The present invention relates to a self-generating streetlight, and more specifically to a self-generating streetlight which is powered by electricity converted from solar energy.

BACKGROUND

In general, a streetlight is powered by electricity generated by a power plant through timer, central control, sensor, etc. The streetlight uses a high-pressure mercury arc lamp, a fluorescent lamp, a sodium-vapor lamp, etc.

The streetlight generally consumes a large amount of electricity. Recently, more and more streetlights are equipped with solar cell modules to reduce the consumption of electricity.

A self-generating streetlight includes a light pole, a condenser, and a battery. The condenser is coupled to the light pole to convert solar energy into electricity. The battery accumulates the electricity.

The self-generating streetlight accumulates electricity during the daytime by a solar cell module which converts solar energy into electricity, and emits light using the accumulated electricity in the nighttime. The self-generating streetlight needs a wide condenser to capture a large amount of solar energy and convert it to a large amount of electricity. However, a wide condenser causes a large stress between the condenser and the light post in windy areas, such that condenser is easily broken. Further, the self-generating streetlight id disfigured by the wide condenser.

The self-generating streetlight is generally equipped with an inverter and a control box containing electronic elements such as battery. Leaking in the control box may cause damage to the electronic elements. To protect the control box from the leakage, a gutter is generally mounted above the control box. However, it is difficult to protect the control box from the leakage from the ground in the rainy season.

DISCLOSURE OF INVENTION

Technical Problem

However, a wide condenser causes a large stress between the condenser and the light post in windy areas, such that the condenser is easily broken. In addition, the self-generating streetlight is disfigured by the wide condenser. Further, it is difficult to protect the control box from the leakage from the ground in the rainy season.

Technical Solution

The present invention provides a self-generating streetlight which provides a fine exterior view, prevents a condenser from breaking, protecting a control box from water leakage, and has a flower-shaped condenser formed.

Additional features of the invention will be set forth in the description which follows, and in part will be apparent from the description, or may be learn by practice of the invention.

Advantageous Effects

According to the present invention, it is possible to protect a conder from breaking due to a strong wind.

In addition, a waterproof unit keeps circuit elements mounted on a control box from being submerged.

Furthermore, the self-generating streetlight may look like natural flower.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

BEST MODE FOR CARRYING OUT THE INVENTION

Figure 1:
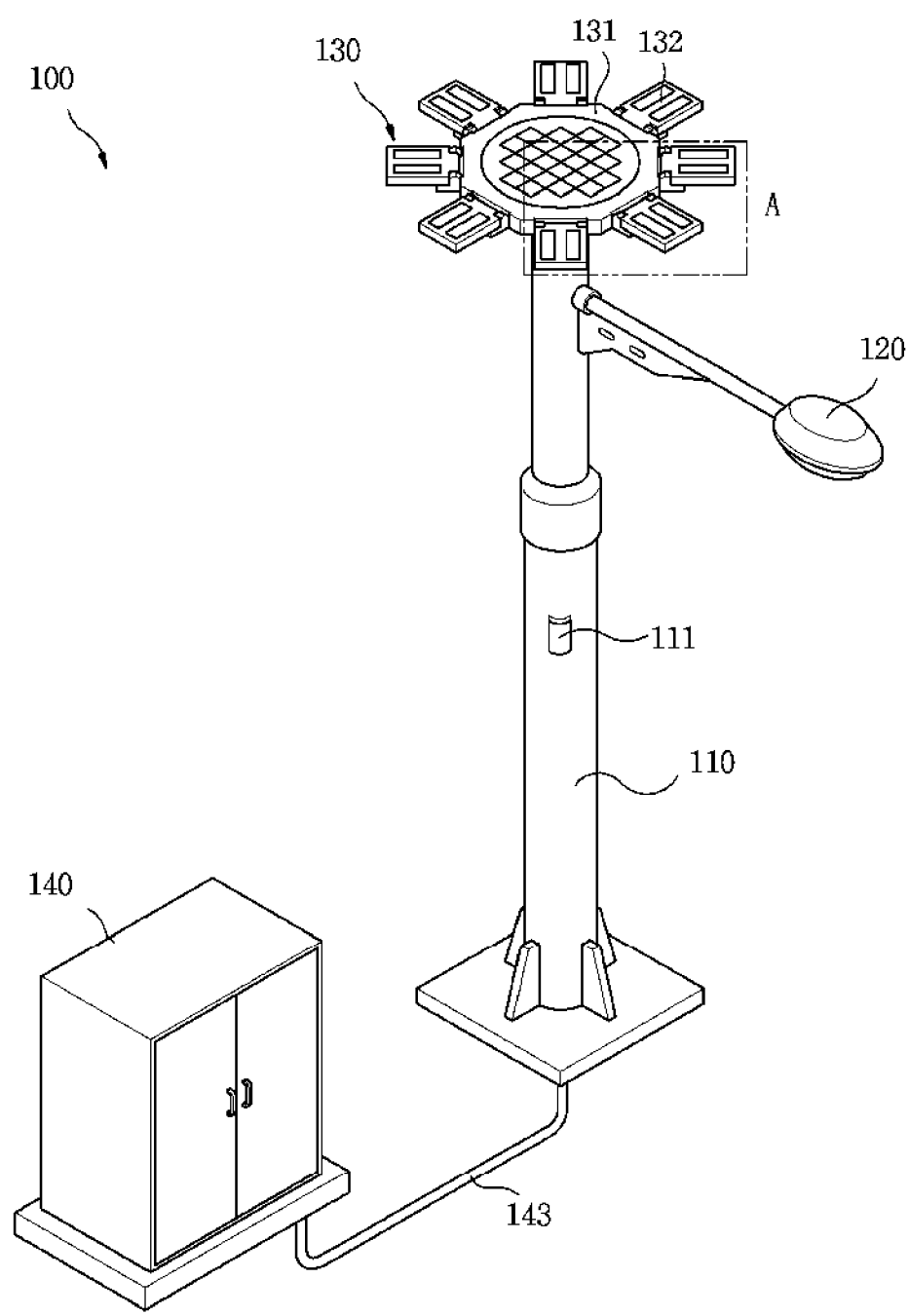
FIG. 1 is a perspective view of a self-generating streetlight according to an exemplary embodiment of the present invention.

The present invention discloses a self-generating including streetlight including: a light pole; a lamp which is provided on the light pole to convert electricity into light; a condenser which comprises a central condenser plate and side condenser plates and converts solar energy into electricity, the central condenser plate being arranged around the central condenser plate; a joint unit which allows the side condenser plates to folded to and extended from the central condenser plate: and a control box which comprises a battery, a power supply, and a controller, the battery accumulating electricity produced by the condenser, the power supply supplying the electricity to the lamp, and the controller controlling the lamp.

It is to be understood that both the foregoing general description and the following detailed description are exemplary and explanatory and are intended to provide further explanation of the invention as claimed.

Mode for the Invention

The invention is described more fully hereinafter with reference to the accompanying drawings, in which exemplary embodiments of the invention are shown.

This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity, Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a perspective view of a self-generating streetlight according to an exemplary embodiment of the present invention.

The self-generating streetlight 100 includes a light pole 110, a lamp 120, a condenser 130, a joint unit, and a control box 140.

The light pole 110 forms a body of the self-generating streetlight 100.

The lamp 120 is attached on the light pole 110 to convert electricity of the condenser 130 to light. The lamp 120 includes a high-pressure mercury arc lamp, a fluorescent lamp, a light-emitting diode (LED), and a sodium-vapor lamp. The lamp 120 may be formed in a flower shape or an insect shape.

The condenser 130 is attached on the light pole 110 to convert solar energy into electricity. The condenser 130 includes a central condenser plate 131 and a side condenser plate 132. The condenser 130 may be either a single solar cell module or an array of multiple solar cell modules.

The central condenser plate 131 consists of at least one solar cell and is attached to the light pole 110. The central condenser plate 131 may be covered with tempered glass or reinforced plastic to protect from breakage due to hailstones or falling objects.

The side condenser plate 132 consists of at least one solar cell which is arranged around the central condenser plate 131. The side condenser plate 131 and 132 may be formed in a flower shape.

For example, the streetlight may be formed like a sunflower, in which the condenser 130 and the light pole 110 are colored in yellow and green, respectively.

The joint unit includes a hinge 133, a motor 134, and a joint controller 135. The joint unit is provided at a joint between the central and side condenser plates 131 and 132 so that the side condenser plate 132 can be folded to the central condenser plate 131.

The hinge 133 is fixed to the side condenser plate 132, and is rotatably coupled to the central condenser plate 131.

The motor 134 is fixed to the central condenser plate 131 to supply power to the hinge 133 through a power-delivering member 136. Examples of the power-delivering member 136 include gears, rollers, and belts.

The joint controller 135 passes electricity from a batter 145 of the control box 140 to the motor 134. In more detail, the joint controller 135 receives the amount of light sensed by the condenser 130. If the amount of light is less than a predetermined threshold, the joint controller 135 controls the side condenser plate 132 to be folded to the central condenser plate 131. If the amount of the light exceeds a predetermined threshold, the joint controller 135 controls the side condenser plate 132 to be extended from the central condenser plate 131. The self-generating streetlight 100 may further include a photosensor 111 to detect the amount of light instead of the condenser 130.

Here, the threshold indicates a boundary value between the amount of solar energy from which the condenser 130 can fully produce electricity and the amount of solar energy from which the condenser 130 can rarely produce electricity. The threshold may be one obtained by manufacturers through simulations.

The condenser 130 is preferably placed at right angles to the light so that the self-generating streetlight 100 can capture as much solar energy as possible. For this purpose, the condenser 130 may be equipped with a tracker (not shown) to keep track of the sun.

In addition, the condenser 130 may be equipped with a wind-pressure sensor (not shown) to protect from a gale.

The control box 140 includes a batter 145, a power supply 146, and a controller 147. The battery 145 accumulates electricity converted from solar energy by the condenser 130. The power supply 146 supplies power to the lamp 120. The controller 147 controls the lamp 120.

The control box 140 includes a waterproof unit to protect circuit elements from water leaks. The waterproof unit includes an air container 144m, a water sensor 141, and an air pump 142. If water exceeding a predetermined threshold flows into the control box 140, the waterproof unit increases the inner pressure of the control box 140 to prevent water from further entering the control box 140.

The air container 144 is opened downward to cover the circuit elements. The air container 144 preferably has no interstices or holes to prevent air leakage, except the opened side. In addition, the air container 144 may be made of material with a high thermal conductivity, such as aluminum or copper, or may be equipped with a heat-radiating plate inside of outside the air container 144 to quickly radiate the heat produced on the circuit elements.

The water sensor 141 is a typical one to detect water entering the control box 140. The water sensor is preferably placed as low as possible to prevent the circuit elements from being submerged.

The air pump 142 supplies air into the air container 144 if the water sensor 141 detects more than a predetermined amount of water. The air pump 142 absorbs in and compresses air, and delivers the compressed air to the air container 144 through an air-conveying member 143 between the control box 140 and the light pole 110. Examples of the air-conveying member 143 include a hose and a pipe.

Accordingly, compared to the absence of the air container 144, it is possible to efficiently prevent the circuit elements of the control box 140 from being submerged.

Figure 2:
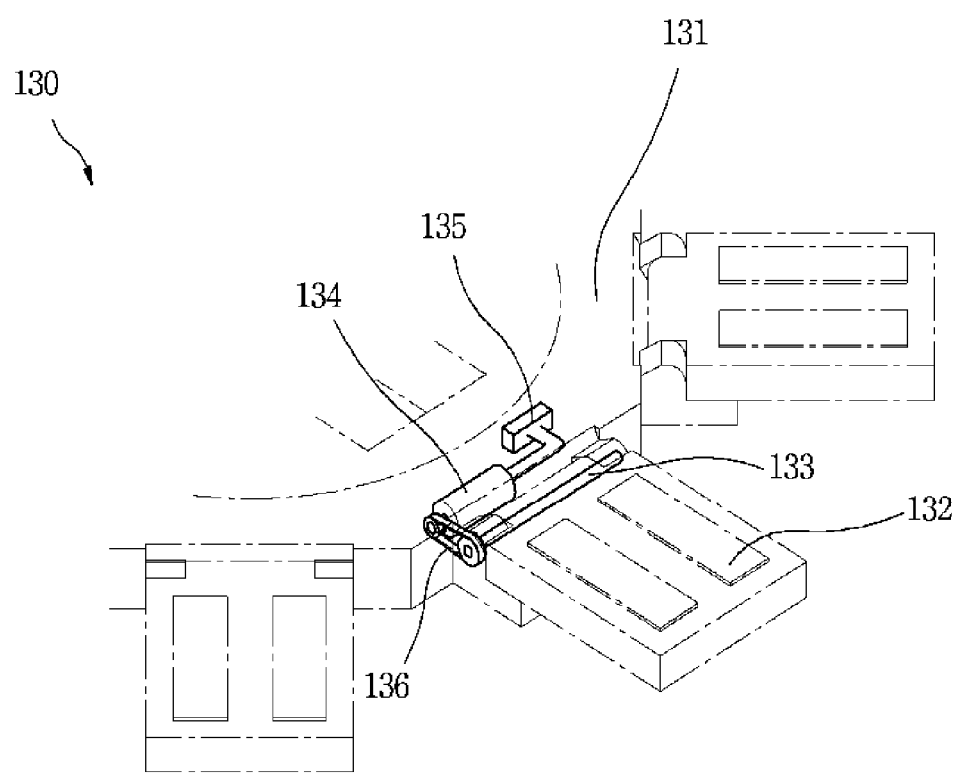
FIG. 2 is an enlarged perspective view of the part A of FIG. 1.
Figure 3:
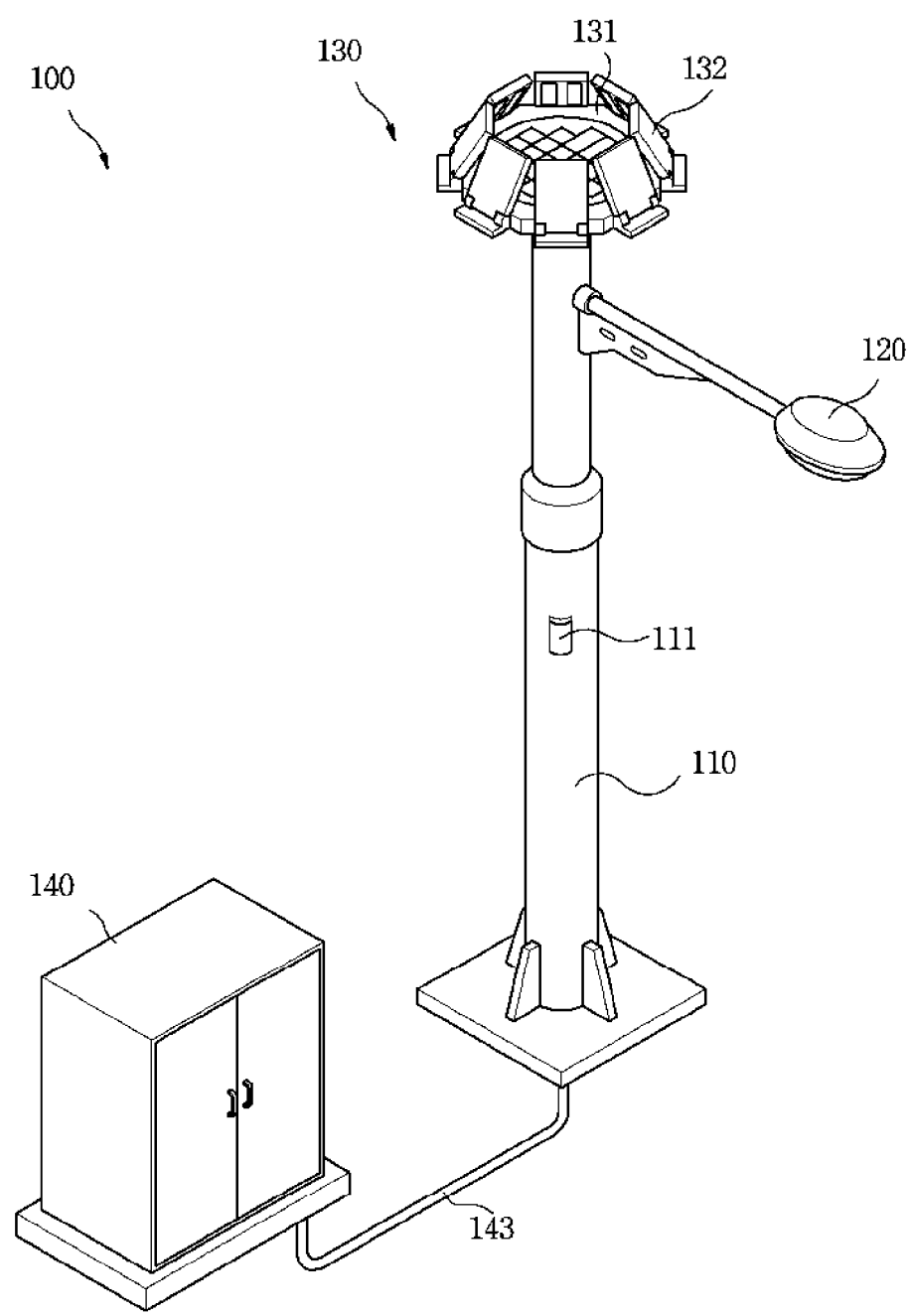
FIG. 3 shows a self-generating streetlight with a condenser folded.
Figure 4:
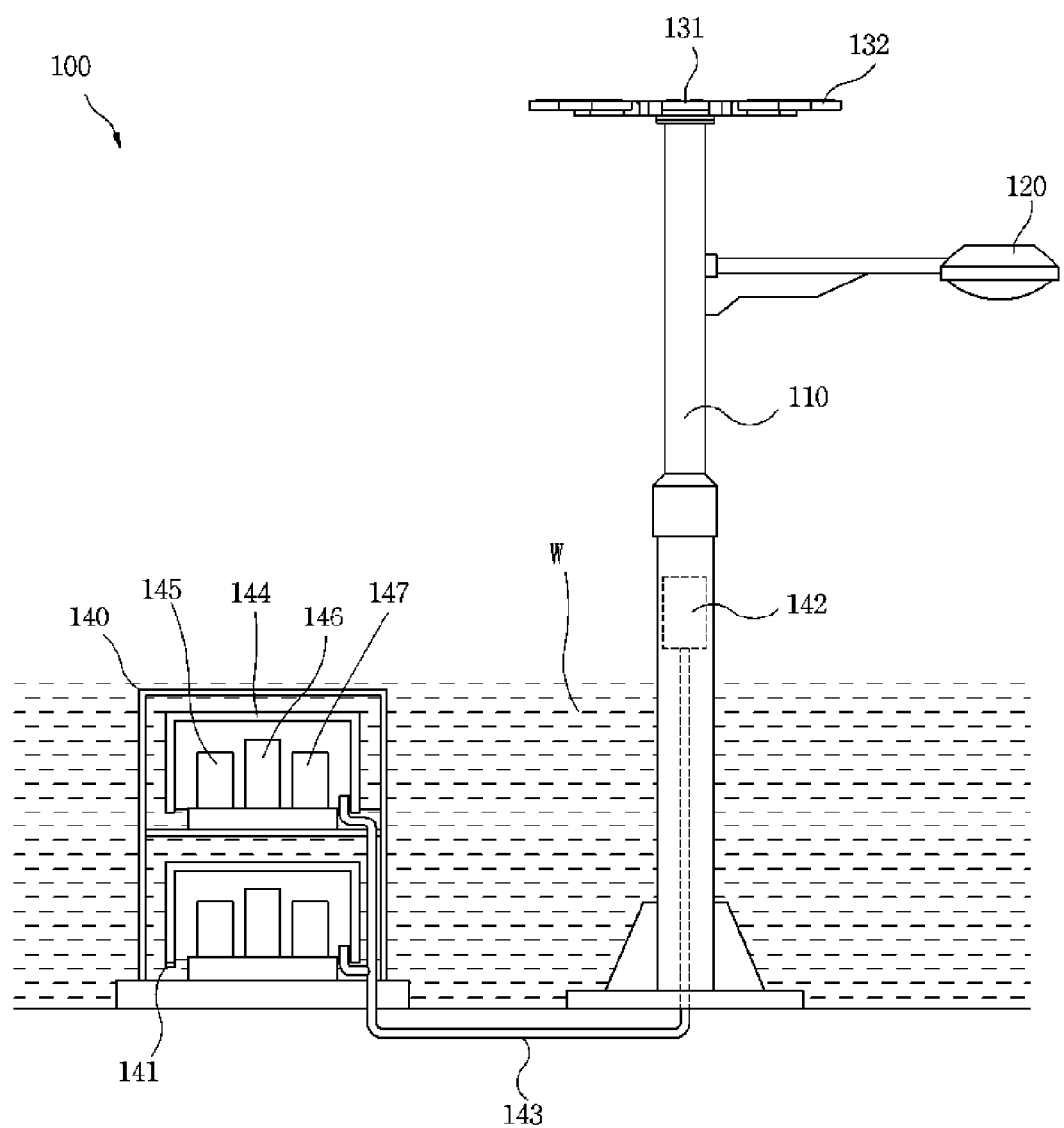
FIG. 4 shows a waterproof unit of a control box according to an exemplary embodiment of the present invention.

Operations of the self-generating streetlight 100 and the waterproof unit will be described with reference to FIGS. 2 to 4.

While the sun is shining, light from the sun is incident on the condenser 130 with the side condenser plate 132 folded to the central condenser plate 131. The condenser 130 detects the amount of light, and delivers the detected amount of light to the joint controller 135. The joint controller 135 determines whether or not the amount of light exceeds a predetermined threshold. If the amount of light exceeds the threshold, the motor 134 fixed to the central condenser plate 131 rotates counterclockwise under the control of the joint controller 135, thereby rotating the hinge 133 through the power-delivering member 136, and subsequently extending the side condenser plate 132 from the central condenser plate 131.

When the sun sets, the condenser 130 detects the amount of light less than a predetermined threshold. The condenser 130 delivers the detected amount of light to the joint controller 135. The joint controller 135 determines whether or not the amount of light exceeds a predetermined threshold. The motor 134 rotates clockwise under the control of the joint controller 135, thereby rotating the hinge 133 through the power-delivering member 136, and subsequently folding the side condenser plate 132 to the central condenser plate 131.

Accordingly, it is possible to protect the condenser 130 from breaking due to a strong wind. Furthermore, the self-generating streetlight 100 may look like a natural flower.

Operation of the waterproof unit will be described with reference to FIG. 4. When roads are flooded in a rainy season, the control box 140, which is installed on the road, may be generally submerged. When water flows into the control box 140, the water sensor 141 detects water, and the control box 140 activates the air pump 142 to compress air and delivers the compressed air to the air container 144 through the air-conveying member 143, thereby increasing air pressure inside the air container 144. Accordingly, it is possible to keep the circuit elements from being submerged.

It will be apparent to those skilled in the art that various modifications and variation can be made in the present invention without departing from the spirit or scope of the invention. Thus, it is intended that the present invention cover the modifications and variations of the invention provided they come within the scope of the appended claims and their equivalents.

INDUSTRIAL APPLICABILITY

The present invention can be efficiently applied to city environment business, parks etc. which need self-generating streetlights which are powered by electricity converted from solar energy and have a fin exterior view.

The invention claimed is:

1. A self-generating streetlight comprising:
a light pole;
a lamp which is provided on the light pole to convert electricity into light;
a condenser which comprises a central condenser plate and side condenser plates and converts solar energy into electricity, the central condenser plate being coupled to the light pole and the side condenser plates being arranged around the central condenser plate;
a joint unit which allows the side condenser plates to be folded to and extended from the central condenser plate;
a control box which comprises a battery, a power supply, and a controller, the battery accumulating electricity produced by the condenser, the power supply supplying the electricity to the lamp, and the controller controlling the lamp,
wherein the joint unit comprises:
a hinge which is fixed to the side condenser plate and is rotatably coupled to the central condenser plate so that the central and side condenser plates can be rotatably coupled to each other;
a motor which delivers rational power to the hinge; and
a joint controller which supplies electricity from the battery.

2. The self-generating streetlight of claim 1, wherein the joint controller receives an amount of light detected by the condenser, allows the side condenser plates to be folded to the central condenser plate if the amount of light is less than a predetermined threshold, and allows the side condenser plates to be extended from the central condenser plate if the amount of light is less than a predetermined threshold.

3. The self-generating streetlight of claim 1, wherein the control box further comprises a waterproof unit which increases inner pressure of the control box to prevent water from entering the control box if an amount of the water exceeds a predetermined threshold.

4. The self-generating streetlight of claim 3, wherein the waterproof unit comprises; an air container a bottom of which is opened to cover circuit elements within the control box; a water sensor which detects water entering the control box; and an air pump which supplies air to the air container if the water sensor detects an amount of water exceeding a predetermined threshold.

5. The self-generating streetlight of claim 1, further comprising a photosensor which senses light from the sun.

* * * * *